United States Patent [19]
Lesesky et al.

[11] Patent Number: 6,025,563
[45] Date of Patent: Feb. 15, 2000

[54] APPARATUS AND METHOD FOR INDICATING LOAD WEIGHT OF A VEHICLE

[75] Inventors: Alan Lesesky, Charlotte, N.C.; Michael Malecha, Lonsdale, Minn.; Robert Weant, Rock Hill, S.C.

[73] Assignees: Vehicle Enhancement Systems, Inc., Rock Hill, S.C.; Creative Development, Inc., Hudson, Wis.

[21] Appl. No.: 08/942,234

[22] Filed: Oct. 1, 1997

[51] Int. Cl.⁷ .......................... G01G 19/08; G01G 23/18; G01G 23/30; G01G 19/22
[52] U.S. Cl. ............................ 177/136; 177/45; 177/177; 702/174
[58] Field of Search .................................. 177/136, 137, 177/138, 139, 141, 45, 46, 47, 48, 49, 177; 702/174

[56] References Cited

U.S. PATENT DOCUMENTS

| | | | |
|---|---|---|---|
| 3,331,458 | 7/1967 | Van Raden et al. | 177/141 |
| 3,655,003 | 4/1972 | Yamajima | 177/177 |
| 4,456,084 | 6/1984 | Miller | 177/141 |
| 4,588,038 | 5/1986 | Takagi | 177/141 |
| 4,592,002 | 5/1986 | Bozarth, Jr. et al. | 364/571 |
| 4,635,739 | 1/1987 | Foley et al. | 177/45 |
| 4,647,906 | 3/1987 | Naylor et al. | 340/347 DA |
| 4,651,838 | 3/1987 | Hamilton et al. | 177/141 |
| 4,835,719 | 5/1989 | Sorrells | 702/174 |
| 4,852,674 | 8/1989 | Gudat | 177/141 |
| 4,854,407 | 8/1989 | Wagner | 177/141 |
| 4,921,578 | 5/1990 | Shiraisji et al. | 177/136 |
| 5,119,895 | 6/1992 | Gradert | 177/141 |
| 5,167,289 | 12/1992 | Stevenson | 177/141 |
| 5,297,334 | 3/1994 | Johnson | 29/861 |
| 5,385,476 | 1/1995 | Jasper | 177/141 |
| 5,478,974 | 12/1995 | O'Dea | 177/141 |
| 5,488,352 | 1/1996 | Jasper | 177/141 |
| 5,491,418 | 2/1996 | Alfaro et al. | 324/402 |
| 5,606,516 | 2/1997 | Douglas et al. | 177/50 |
| 5,610,372 | 3/1997 | Phillips et al. | 177/141 |
| 5,650,930 | 7/1997 | Hagenbuch | 177/141 |
| 5,677,667 | 10/1997 | Lee | 177/141 |
| 5,796,179 | 8/1998 | Honaga | 307/10.5 |
| 5,802,389 | 9/1998 | McNutt | 395/821 |
| 5,803,502 | 9/1998 | Noll et al. | 283/79 |

*Primary Examiner*—Randy W. Gibson
*Attorney, Agent, or Firm*—Allen, Dyer, Doppelt, Milbrath & Gilchrist, P.A.

[57] ABSTRACT

An apparatus and methods are provided for for indicating load weight of a vehicle. The apparatus preferably includes a fluid pressure sensor, such as a transducer, associated with a fluid pressure line of a vehicle for producing a plurality of fluid pressure signals representative of a corresponding plurality of load weights and a load weight indicating device responsive to the sensor for indicating a plurality of load weight levels. The load weight indicating device includes a memory for storing a calibration signal representative of a predetermined load weight limit level and a comparator in communication with the memory and the sensor for comparing the calibration signal to the plurality of fluid pressure signals. The device also preferably includes a plurality of indicators responsive to the comparator for indicating at least two load weight levels. The plurality of indicators include a first load weight level indicator for only indicating when the load weight level exceeds the predetermined load weight limit level and a second load weight level indicator for only indicating when the load weight level is below the load weight limit level.

70 Claims, 6 Drawing Sheets

APPARATUS AND METHOD FOR INDICATING LOAD WEIGHT OF A VEHICLE

FIELD OF THE INVENTION

The present invention relates to the field of vehicle electronic systems and, more particularly, to an apparatus and method which indicate a load weight of a vehicle.

BACKGROUND OF THE INVENTION

Over the years, the heavy duty vehicle industry has used tractor and trailer combinations to transport cargo over the roadways to various desired destinations. The tractor and trailer are conventionally mechanically coupled together so that the tractor efficiently and effectively pulls the trailer. Often, one or more additional trailers are also mechanically coupled to another trailer so that only one tractor pulls a plurality of trailers.

Associated with these various tractor/trailer combinations or trucks, various systems have been developed which provide a vehicle operator, a vehicle driver, or other third parties with the weight of a load in the trailer or associated with the truck. These systems, for example, can include sensors mounted to the trailer or truck, a cab mounted display, load supporting air bags, and bag supported platforms or other mounting structures. These systems, however, can be quite complex, can be expensive to purchase and install, and can add additional undesired weight to the vehicle. These systems also often can be easily damaged during use due to the harsh environmental and operating conditions which the vehicle undergoes and can be expensive to maintain or replace. Therefore, these systems are often not desirable by owners of the vehicles, especially owners of a fleet of vehicles such as trucks where these systems would need to be installed and maintained on all of the trucks in the fleet.

More recently, load weight indicating systems have been developed which mount to a heavy duty vehicle having an existing vehicle air bag system for regulating height or levels of a platform. An example of such a system can be seen in U.S. Pat. No. 4,832,141 by Perini et al. titled "Vehicle Mounted Load Indicator System." These systems include somewhat complex look-up tables, table select switches, and a seven segment display and drive circuitry for displaying a precise load weight of goods loaded on a platform of a trailer. The look-up tables include address-to-pressure converting data and address-to-weight data. These load weight indicating systems, however, can still be expensive and provide less desire for vehicle operators to adopt and purchase such systems, especially for entire fleets of heavy duty vehicles such as tractor/trailer combinations or trucks.

SUMMARY OF THE INVENTION

With the foregoing in mind, the present invention advantageously provides a simpler and less expensive apparatus and method for indicating load weight to a vehicle operator, vehicle driver, or other person desiring data about the load weight of a vehicle. The present invention also advantageously provides a simple calibration method for calibrating an initial weight limit value or level for the vehicle. The present invention additionally advantageously provides an apparatus and method for indicating load weight which are less complex, which are readily adaptable to rugged conditions often associated with heavy duty vehicles, and which are easily installed on existing vehicles. The present invention further advantageously provides an apparatus and method for load weight indication which are compatible with existing vehicle data communications systems and/or power distribution systems.

More particularly, an apparatus for indicating load weight of a vehicle according to the present invention preferably includes a fluid pressure sensor, such as a transducer, associated with a fluid pressure line of a vehicle for producing a plurality of fluid pressure signals representative of a corresponding plurality of load weights and load weight indicating means responsive to the fluid pressure sensor for indicating a plurality of load weight levels. The load weight indicating means preferably includes a memory for storing a calibration signal representative of a predetermined load weight limit level, comparing means in communication with the memory and the fluid pressure sensor for comparing the calibration signal to the plurality of fluid pressure signals, and a plurality of indicators responsive to the comparing means for indicating at least two different load weight levels. The plurality of indicators preferably include a first load weight level indicator for only indicating when the load weight level exceeds the predetermined load weight limit level and a second load weight level indicator for only indicating when the load weight level is below the load weight limit level.

A load weight indicating apparatus according to the present invention advantageously may also include the plurality of indicators of the load weight indicating means further having a third load weight level indicator for only indicating when the load weight level is above a predetermined percentage of the predetermined load weight level limit. The predetermined percentage is preferably less than the predetermined load weight level limit so as to warningly indicate that the load weight level is approaching but has not yet exceeded the predetermined load weight level limit. The fluid pressure sensor, e.g., a transducer, preferably produces varying analog signals responsive to varying fluid pressures in the pressure line. The comparing means preferably includes an accurate analog-to-digital converter which converts the varying analog signals to digital signals so that pressure variations can be identified and determined quite accurately. The comparing means also preferably includes load weight indication controlling means connected to the analog-to-digital converter, the memory, and the plurality of indicators for controlling the load weight indication.

According to another aspect of the present invention, the load weight indicating apparatus also preferably has a second sensor associated with the load weight indicating means for sensing a predetermined signal to indicate that the load weight indicating means is ready for calibrating to the predetermined load weight level limit. The second sensor can advantageously be provided by a magnetic sensing switch for sensing the presence of a magnetic field.

For example, in operation, a magnetic device such as easily carried by a vehicle operator can be passed by the vehicle operator adjacent the magnetic sensitive switch such as when the ignition switch of the vehicle is in an on position. The indication controlling means is preferably responsive to the magnetic sensitive switch so that the sensed presence of the magnetic field responsively stores the fluid pressure signal sensed by the first sensor or transducer in the memory. The sensed presence of the magnetic field, for example, can include a predetermined sensing pattern. In this manner, the likelihood of the second sensor sensing an arbitrary, unintentional, or false triggering signal is greatly reduced.

Alternatively, or in combination with the sensed pattern, the second sensor can be configured so that it senses a signal only during a predetermined time period or timing window such as within a 30 second period after the key in the ignition is turned. Also, the second sensor can be configured to only sense a signal during a predetermined condition such as when the emergency flashers are in an on position or when the headlights, side marker lights, or rear taillights are in an on position. Further, instead of using the second sensor, the predetermined calibration threshold or signal can be pre-programmed such as corresponding to known trailer frame or structure types.

Once the predetermined pattern, time period, or other condition is met, the first indicator can flash a first predetermined colored light, such as red, during the calibrating condition. In other words, the predetermined calibration threshold or signal is stored after the desired weight is either loaded and stored or pre-programmed. When the ignition switch is turned off, for example, a pressure signal corresponding to the desired weight can be stored. After the vehicle is empty or ready for loading, the second indicator can flash a second predetermined colored light, such as green, to indicate that the weight of the goods being added has not exceeded the predetermined load weight level limit. As the added weight approaches the predetermined load weight level limit, a third predetermined colored light, such as yellow, can flash to indicate that the weight being added is below the predetermined limit but is yet only a small percentage less than the limit, e.g., 2–15% less.

According to still another aspect of a load weight indicating apparatus according to the present invention, the load weight indicating means can additionally include data communications protocol converting means connected to the load weight indication controlling means for converting a first data communication protocol associated with a vehicle to a second data communications protocol such as associated with the load weight indicating means. This aspect, for example, advantageously allows the load weight indicating means to communicate with a data communications controller or other portion of a data communication system associated with a vehicle. A transceiver can also be connected to the data communications protocol converting means and a power line of the vehicle for transmitting and receiving data communications to and from the load weight indicating means and a data communication system of the vehicle, e.g., along the power line as a carrier for the data communications.

According to yet another aspect of the invention, the load weight indicating means is preferably mounted to the vehicle so that it is readily visible to a driver of the vehicle during the loading process, e.g., from side or rearview mirrors. Alternatively, the load weight indicating means can also include drive circuitry for driving an audible alarm, an analog gauge, a relay, or other device to indicate only the two or three levels of load weight as described above.

Further still, a load weight apparatus according to the present invention can advantageously include an environmental sensor, e.g., temperature, barometric pressure, humidity, either connected to or associated with the load weight indicating means. A temperature sensor, for example, can sense a plurality of environmental temperatures of the load weight indicating means. The memory preferably stores at least one predetermined temperature threshold. The comparing means also compares a sensed temperature with the at least one predetermined temperature threshold so as to responsively adjust either the calibration signal or the fluid pressure signals when the sensed temperature exceeds the at least one predetermined temperature threshold. Other senors such as barometric pressure, humidity, shock, or vibration can also be included and operate in a similar manner.

The present invention also advantageously includes methods of indicating load weight of a load mounted on a vehicle. A method according to the present invention preferably includes producing a plurality of fluid pressure signals representative of a corresponding plurality of load weights and comparing a predetermined calibration threshold signal to the plurality of fluid pressure signals. When one of the plurality of fluid pressure signals exceeds the predetermined calibration threshold signal, a signal is generated or initiated indicating this condition.

Another method of indicating load weight according to the present invention preferably includes sensing a signal indicating the initiation of a calibration condition and storing a first fluid pressure signal representative of a predetermined load weight level limit in memory responsive to the sensed calibration condition so as to define a predetermined calibration threshold signal. A second fluid pressure signal is then compared to the predetermined calibration threshold signal so as to determine whether the second fluid pressure signal exceeds the predetermined calibration threshold signal.

Therefore, the present invention advantageously provides a much simpler and less expensive apparatus and method for indicating load weight to a vehicle operator, vehicle driver, or other person desiring data about the load weight of a vehicle. The apparatus and method advantageously provide a simple and light weight device that can be readily mounted to a trailer, readily powered by existing power systems of a vehicle, and readily provides at least two and preferably three levels of load weight indication. In other words, a vehicle operator does not always need to know the exact weight of goods that is being loaded into a vehicle at any given time period. Instead, the vehicle operator often only needs to know whether or when the weight limit has been exceeded or whether or when the weight limit is almost being exceeded. The apparatus and method invention also advantageously provides a simple and flexible calibration method for calibrating an initial weight limit value or level for the vehicle. The calibration method, for example, allows the apparatus to avoid inadvertent, unintentional, or undesired calibration attempts.

BRIEF DESCRIPTION OF THE DRAWINGS

Some of the objects and advantages of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

Figures 5, 6:
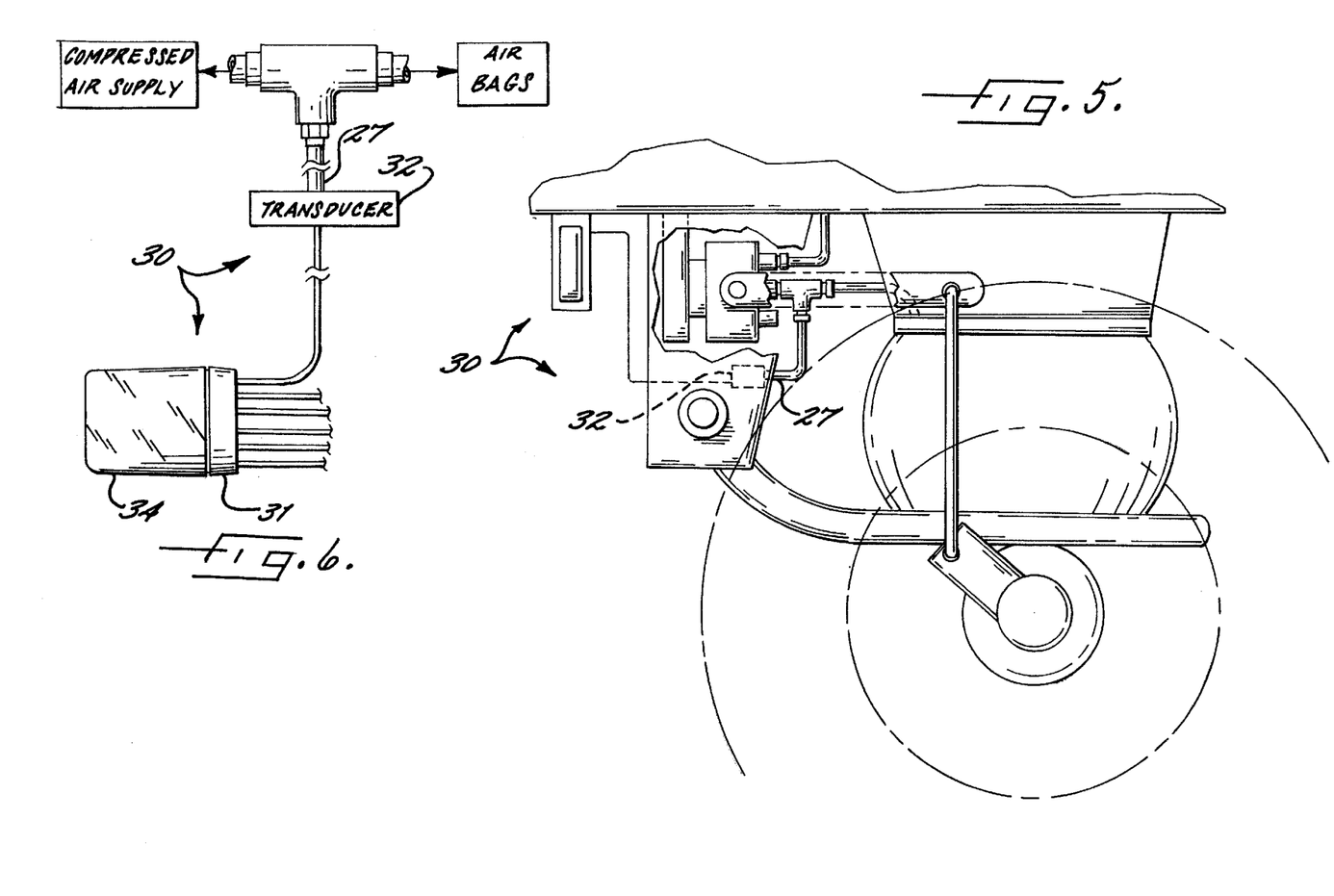
FIG. 5 is a fragmentary side elevational view of a load weight indicating apparatus mounted to a heavy duty vehicle according to the present invention.
FIG. 6 is a schematic view of a load weight indicating apparatus mounted to a fluid pressure line of a heavy duty vehicle according to the present invention.

FIGS. 1 and 5–6 illustrate a load weight indicating apparatus 30 mounted to a heavy duty vehicle 20, namely a tractor 21 and trailer 25 coupled together in combination, which, for example, monitors the air suspension of the rear tractor 21 and/or trailer 25 axles to alert a vehicle operator when the vehicle 20 reaches a maximum load allowance. This maximum load allowance, for example, can be a predetermined weight limit that the tractor/trailer combination may not legally exceed. The apparatus 30 preferably includes a fluid pressure sensor 32 associated with a fluid pressure line 27 of the vehicle 20 for producing a plurality of fluid pressure signals representative of a corresponding plurality of load weights. The fluid pressure sensor 32 is preferably provided by a transducer connected to an air bag pressure line of the trailer suspension portion of the vehicle. The transducer, for example, can be a Honeywell PNX752-PC transducer which quite accurately produces varying analog voltage signals, i.e., +/−0.02% hysteresis as understood by those skilled in the art, or levels that range between about 0.4 volts and 4.5 volts for various sensed pressures in the air pressure line 27. In other words, the transducer produces varying analog signals responsive to respective varying fluid pressures in the pressure line 27 of the vehicle 20. As understood by those skilled in the art, other sensors can be used as well according to the present invention.

Figure 2:
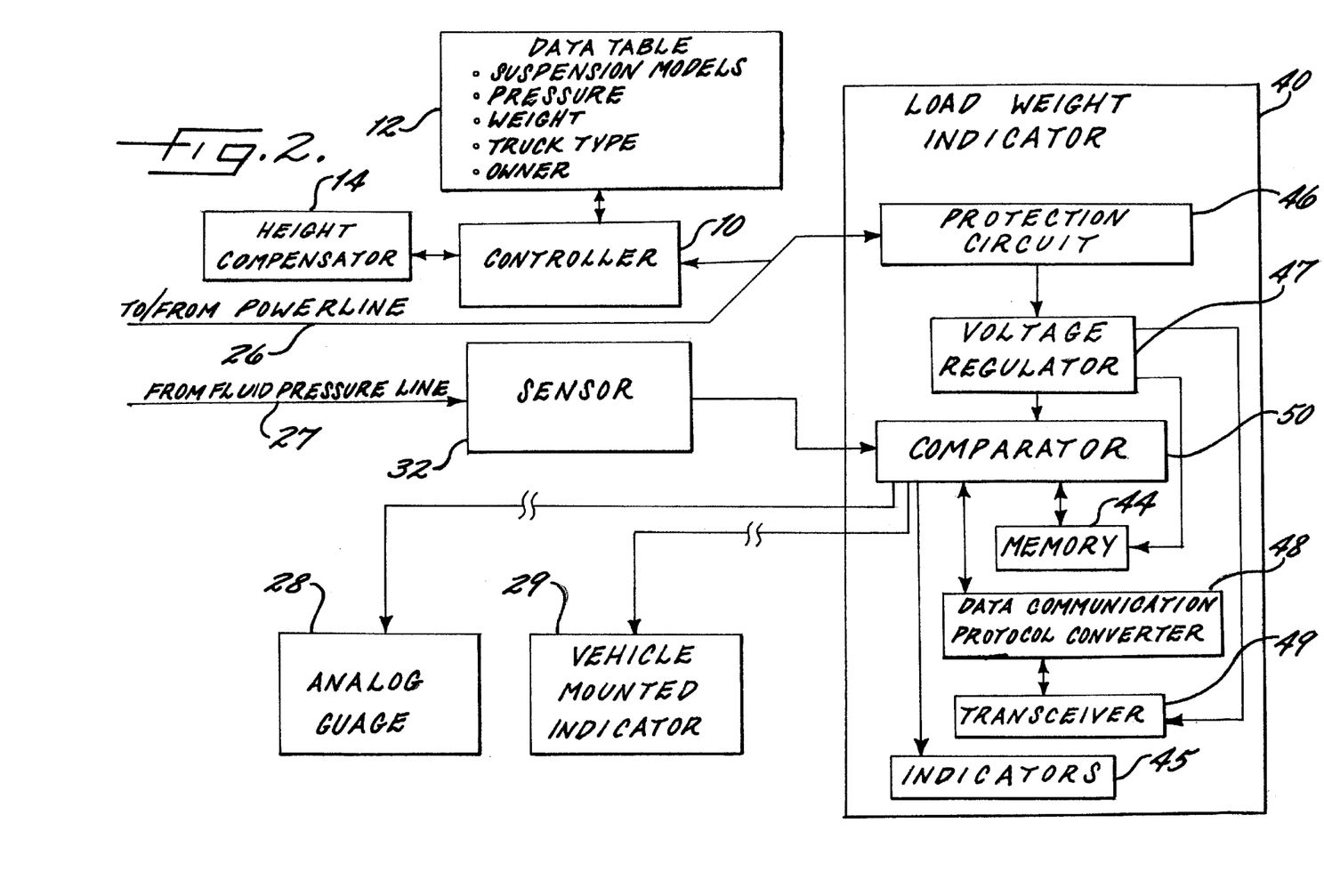
FIG. 2 is a schematic diagram of a load weight indicating apparatus according to the present invention.
Figure 3:
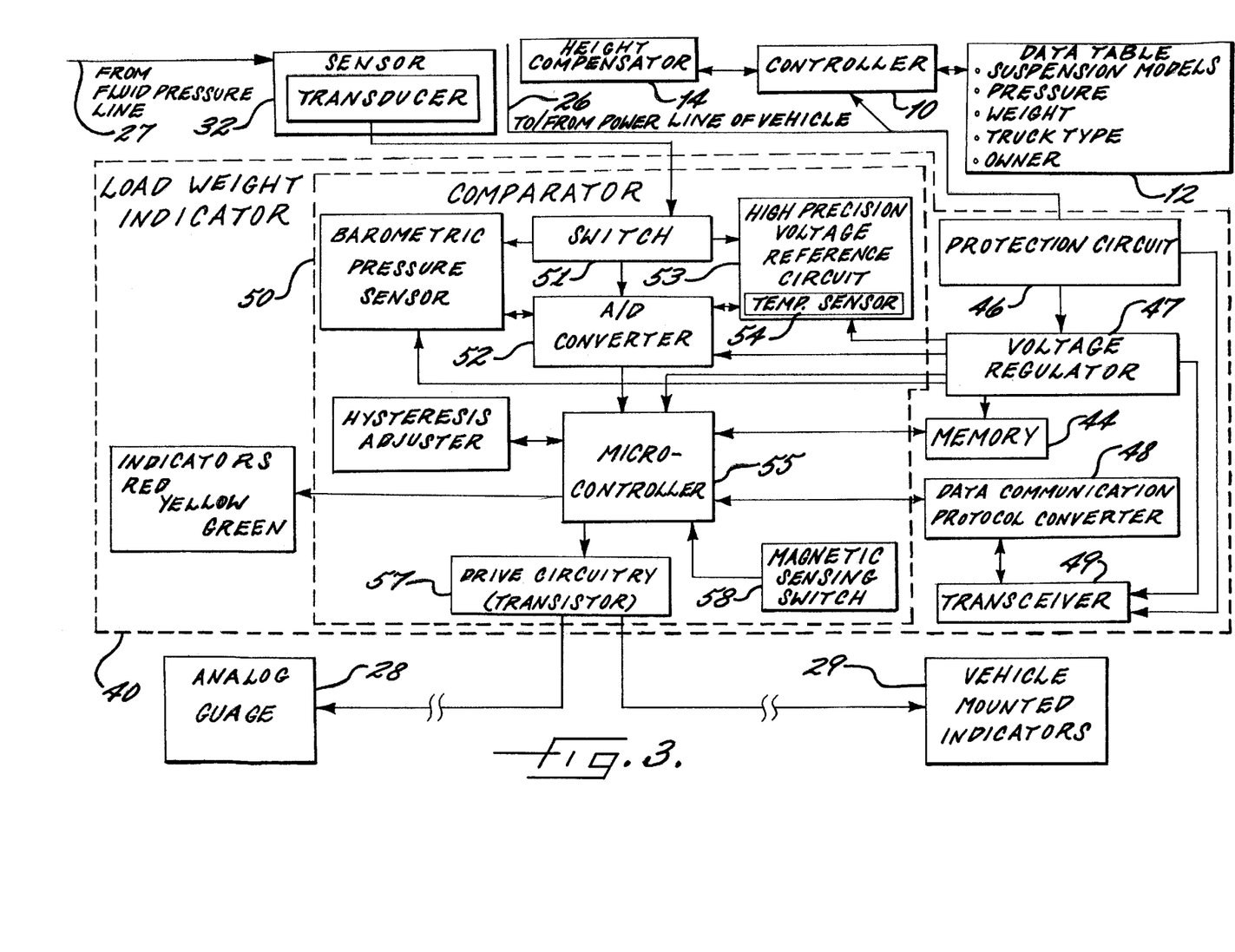
FIG. 3 is a schematic diagram of a load weight indicating apparatus according to the present invention.

As perhaps best illustrated in FIGS. 2–3, the load weight indicating apparatus 30 also includes load weight indicating means, e.g., provided by a load weight indicator or indicating circuit 40, responsive to the fluid pressure sensor 32 for indicating a plurality of load weight levels. The load weight indicating means 40 preferably includes a memory 44 for storing a calibration threshold or threshold signal representative of a predetermined load weight limit level, comparing means 50 in communication with the memory 44 and the fluid pressure sensor 32 for comparing the calibration signal to the plurality of fluid pressure signals, and a plurality of indicators 45 responsive to the comparing means for indicating at least two load weight levels. The memory 44 is preferably an electrically or electronically erasable memory device, but other separate or partial memories of other circuits, including random access memory, read-only memory, erasable programmable memory, and programmable read-only memory, can also be used as well according to the present invention. The memory 44 preferably stores voltage values or voltage signals for comparison by the comparing means 50. The comparing means 50 or comparator advantageously constantly compares the transducer or sensor reading with a calibration threshold level or threshold signal stored in the memory 44.

The plurality of indicators 45 preferably include a first load weight level indicator 41 for only indicating when the load weight level exceeds the predetermined load weight limit level and a second load weight level indicator 42 for only indicating when the load weight level is below the load weight limit level. The plurality of indicators 45 also preferably includes a third load weight level indicator 43 for only indicating when the load weight level is above a predetermined percentage of the predetermined load weight level limit. The predetermined percentage, e.g., in the range of 85–99%, is preferably less than the predetermined load weight level limit so as to warningly indicate that the load weight level is approaching but has not yet exceeded the predetermined load weight level limit.

Figure 7:
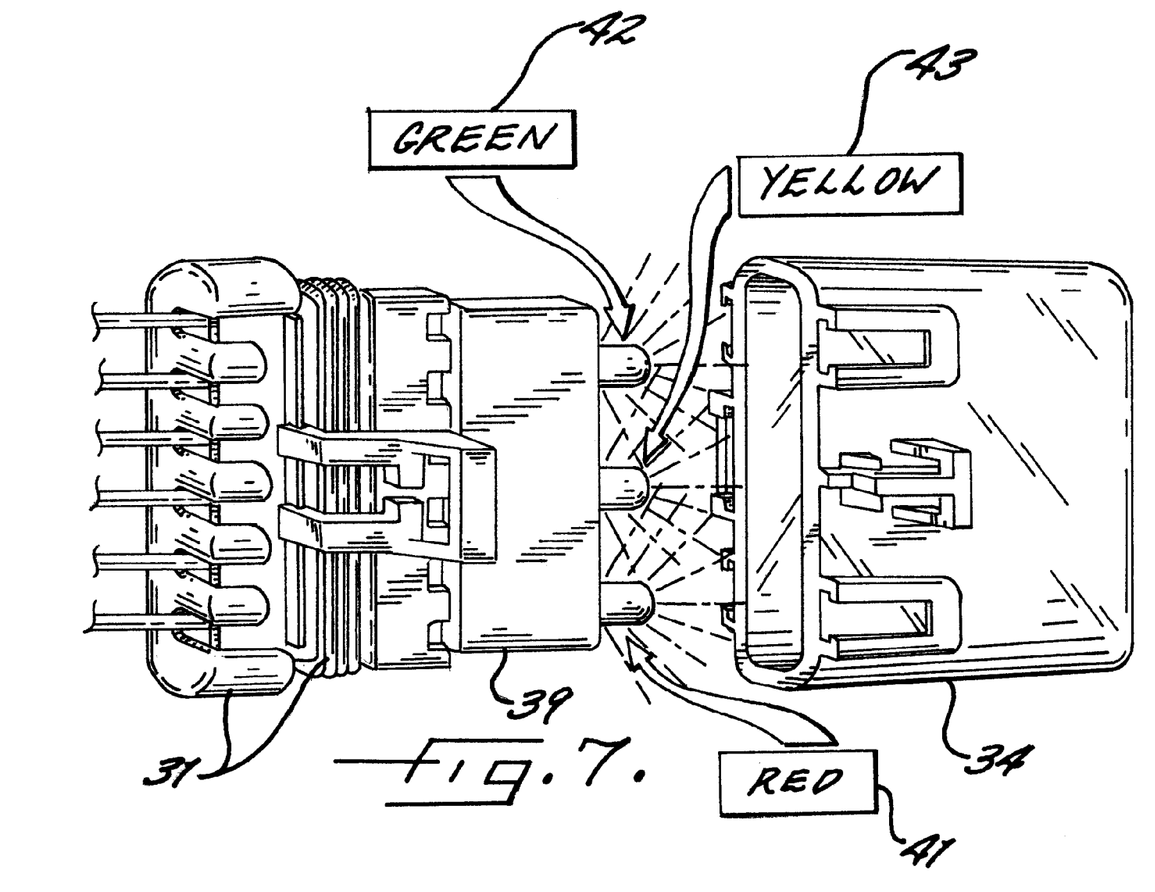
FIG. 7 is an exploded perspective view of a load weight indicating apparatus according to the present invention.

As perhaps best illustrated in FIG. 7, the first load weight level indicator 41 is preferably provided by a red light emitting diode. The second load weight level indicator 42 is preferably provided by a green light emitting diode. The third load weight level indicator 43 is preferably provided by a yellow light emitting diode. The plurality of indicators 45 are preferably connected to either a separate drive circuit or directly to a microcontroller 55 or a microprocessor as understood by those skilled in the art and as described further herein. Advantageously, the load weight indicating means 40 and associated circuitry are preferably formed as an electronic module 39 or mounted on a printed circuit board that, in turn, is mounted to a standard six pin connector 31 such as known and familiar to those in the heavy duty vehicle or trucking industries. The six pins of the connector 31, for example, can be wired to connect to direct current or DC power, ground, transducer +5 volts, transducer ground, transducer input, and an external lamp input or alarm output.

In this manner, a connector 31 with which those in the heavy duty vehicle industry are readily familiar can advantageously be used. The connector 31 preferably has a housing or cover member 34 specifically designed to be adaptable to and matingly connect to the six pin connector 31. The cover member 34 has a generally rectangular shape and is preferably formed of a translucent material so that light emitted from the light emitting diodes 41, 42, 43 can readily be visible therethrough. The cover member 34 is preferably formed of a plastic or polymeric material. The connector 31 and/or cover member 34 preferably have tie openings formed therein for securing or attaching the cover member 34 or connector 31 to a frame or other portion of a vehicle. Mounting hardware or fasteners can also be used as understood by those skilled in the art.

Alternatively, a harness or other connector can be used to attach the connector 31 and cover member 34 to a vehicle 20. For example, a rear or side light can be detached or unplugged and the ground and power to the light be used for the ground and power for the six pin connector 31. A harness can advantageously be used to secure the connector 31 and cover member 34 to the vehicle 20 so that connecting or wiring is simplified. A plurality of harnesses, e.g., about 4–7 harnesses, can also be provided for connection to the tractor and/or trailer.

As further illustrated in FIGS. 2–3, the load weight indicating means 40 preferably further includes an analog-to-digital ("A/D") converter 52 connected to the transducer 32 for converting the varying analog signals to digital signals prior to being transferred to the microcontroller 55. The A/D converter 52 is preferably a 16 bit or other accurate A/D converter 52 such as provided by an Analog Devices AD7715 (16 bit sigma-delta) A/D converter. The conversion of such a device can be relatively slow, but advantageously should be quite accurate, e.g., preferably within about 200 pounds of a desired weight threshold. The improved or increased accuracy of an A/D converter 52 for the invention, for example, advantageously allows the threshold indication levels to be quite accurate and increases confidence in the vehicle operators. Advantageously, the A/D converter 52 preferably has a plurality of channels for providing different inputs, but only a single channel and a switch 51 such as illustrated can be used as well.

The comparing means 50 of the load weight indicating means 40 is preferably provided by a comparator or other comparison circuit and preferably includes load weight indication controlling means connected to the analog-to-digital converter 52, the memory 44, and the plurality of indicators 45 for controlling the load weight indication. The load weight indication controlling means is preferably provided by a microcontroller 55 or microprocessor capable of or operable based upon stored program control as understood by those skilled in the art. The microcontroller 55, for example, can be provided by an 8-bit reduced instruction set computing ("RISC") processor or microcontroller such as the Micro-Chip 17C4X.

The comparator 50 preferably also includes hysteresis adjusting means, e.g., preferably provided by a hysteresis adjuster 59 for adjusting the hysteresis of the load weight indicating means 40 of the apparatus 30. The hysteresis adjuster 59 is preferably a software program or routine within the microcontroller 55, as understood by those skilled in the art, but may also be a separate circuit, program, or routine such as in a memory device as illustrated in FIG. 3. The program, for example, can include a loop or routine for adjusting hysteresis in real time, as expected, or as actually measured. The hysteresis adjuster 59, for example, thereby preferably adjusts or compensates for the hysteresis of the load weight indication within less than 1%, e.g., within +/−200 lbs., of the total allowable load weight, e.g., 36,000 lbs. Preferably, the hysteresis is even less than 0.5% of the total allowable load weight. In other words, the adjuster advantageously provides a margin of error for overshoot or undershoot of the threshold levels indicated by the load weight indicating means.

The comparator 50 of the load weight indicating means 40 can advantageously also include a voltage reference circuit 53 connected to the analog-to-digital converter 52 and a switch 51 more directly connected to or as an input from the transducer 32. The comparator 50 also preferably includes one or more environmental sensors, e.g., temperature, barometric pressure, humidity, shock, vibration, for sensing environmental conditions associated with the use of the apparatus 30. For example, the voltage reference circuit 53 can advantageously include an internal temperature sensor 54 which is associated therewith so that the environmental temperature of the load weight indicating means 40 is also periodically supplied to the analog-to-digital converter 52. The voltage reference circuit 53, for example, can be provided by an Analog Devices 780 high-precision voltage reference circuit. Other environmental sensors such as barometric pressure sensor 56 as understood by those skilled in the art and as illustrated can be used as well. Such sensors are generally known and commercially available.

The load weight indicating means 40 preferably receives power from the power line 26 of the vehicle 20. The power line 26 of the vehicle 20 is preferably connected to a load dump protection circuit 46 to protectively filter or keep the voltage low for the circuitry associated with the load weight indicator 40. Also, a 5-volt voltage regulator 47 is preferably connected to the load dump protection circuit 46 for supplying a regulated 5-volts to the various circuits of the load weight indicator 40 as illustrated in FIGS. 2–3.

Figure 4:
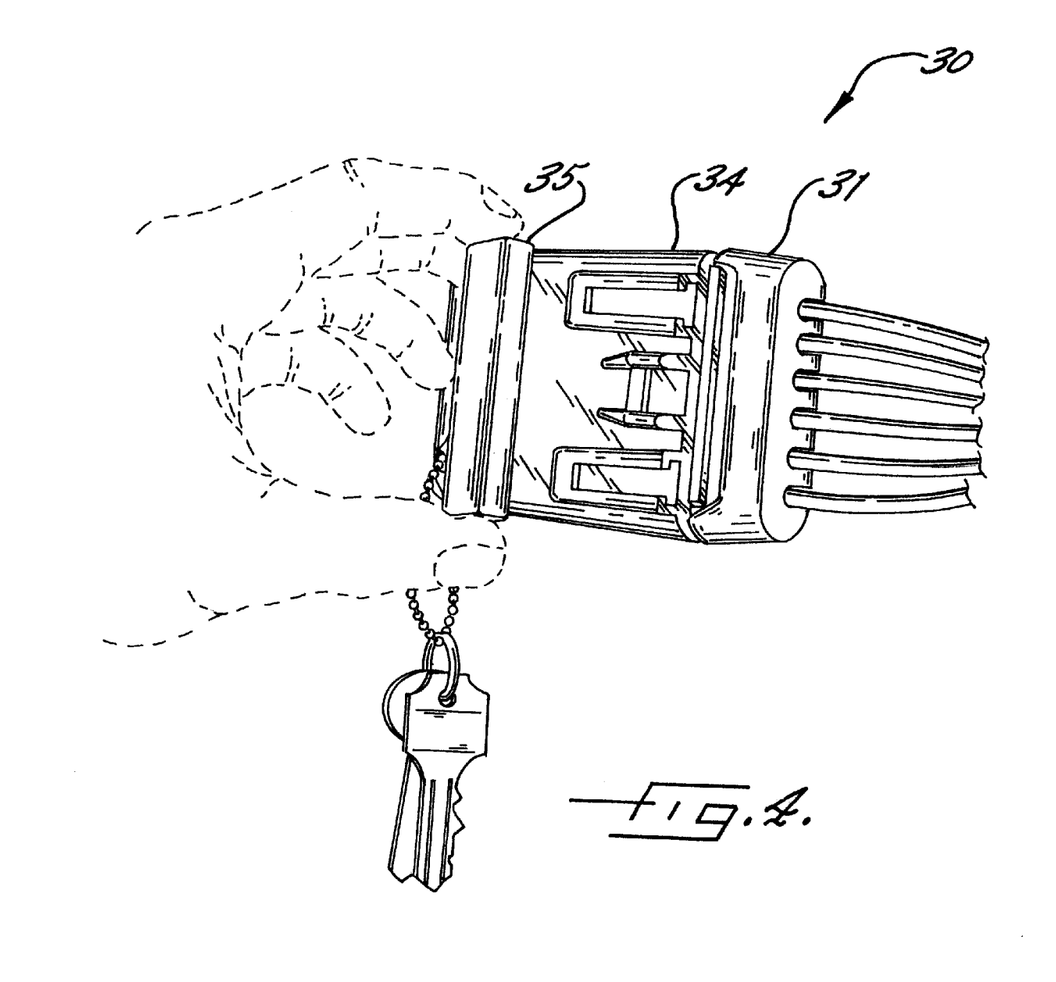
FIG. 4 is a perspective view of a load weight indicating apparatus according to the present invention.

As illustrated in FIGS. 3–4, the comparator 50 of the load weight indicating means 40 preferably further includes a second sensor 58 for sensing a predetermined signal to indicate that the load weight indicating means 40 is ready for calibrating to the predetermined load weight level. The second sensor 58 is preferably provided by a magnetically sensitive switch, e.g., a magnetic reed switch or magneto-resistor, for sensing the presence of a magnetic field. Alternatively, an external ground wire, for example, can also be used to program or calibrate the vehicle's weight configuration. Other types of sensors, such as optical, radio frequency, electronic or electrical-mechanical sensors, can be used as well for this second sensor 58 according to the invention. The load weight indication controlling means 55 is responsive to the magnetically sensitive switch 58 so that the sensed presence of the magnetic field responsively stores the fluid pressure signal in the memory 44 to thereby calibrate or set the apparatus for a level or value to which comparisons can be made. Also, as an alternative the calibration value(s) or threshold(s) advantageously can be pre-programmed so that the magnetic or other sensor is not needed. For example, the calibration value or signal can be locked or fixed for various types of models of trailer or other vehicle suspension characteristics.

Further, this calibration or threshold value or signal can also be communicated over the vehicle data bus or the power line, e.g., J1708 data communications, as illustrated and as understood by those skilled in the art. As illustrated in FIGS. 2–3, this data can be communicated along the power lines from a data table 12 connected to a dedicated controller 10 or one of the other controllers 24 associated with the vehicle. The data table 12, for example, provides a load weight indication calibrating means associated with the load weight indicating means for providing a load weight indication calibration. The data table 12, for example, can include data in memory representative of load weight, pressure or other calibrating data on the suspension types or models, pressure, weight, trailer or tractor types, i.e., truck type, the owner or manufacturer identification, or other identification data. It will also be understood by those skilled in the art that the data table 12 can also be within the comparator such as a software program or data table within the microcontroller or the memory.

As best illustrated in FIG. 4, the apparatus 30 also includes sensing switch activating means 35 for sensingly activating the second sensor 58 of the load weight indicating means 40. The sensing switch activating means is preferably provided by a magnetic device 35 such as mounted to a key-chain, carried by a vehicle operator, or carried by the vehicle 20. The sensed presence of the magnetic field preferably includes a predetermined magnetic field sensing pattern so that a magnetic device 35 arbitrarily passing across or within range of the magnetic sensitive switch will not accidentally or arbitrarily initiate the calibration mode.

In this manner, the likelihood of the second sensor 58 sensing an arbitrary, unintentional, or false triggering signal is greatly reduced. Alternatively, or in combination with the sensed pattern, the second sensor 58 can be configured so that it senses a signal only during a predetermined time period or timing window such as within a 30 second period after the key in the ignition is turned. Also, the second sensor 58 can be configured to only sense a signal during a predetermined condition such as when the emergency flashers are in an on position or when the headlights, side marker lights, or rear tail lights are in an on position.

For example, in operation, a magnetic device 35 such as easily carried by a vehicle operator can be passed by the vehicle operator adjacent the magnetic sensitive switch 58 such as when the ignition switch of the vehicle 30 is in an on position. The load weight indication controlling means 55 is preferably responsive to the magnetic sensitive switch 58 so that the sensed presence of the magnetic field responsively stores the fluid pressure signal sensed by the first sensor 32 or transducer in the memory 44. The sensed presence of the magnetic field, for example, can include a predetermined sensing pattern.

Once the predetermined pattern, time period, or other condition is met, the first indicator 41 can flash a first predetermined colored light, such as red from a red light emitting diode, during the calibrating condition. In other words, the predetermined calibration threshold or threshold signal is stored after the desired weight is either loaded and stored or pre-programmed. When the ignition switch is turned off, for example, a pressure signal corresponding to the desired weight can be stored. After the vehicle 20 is empty or ready for loading, the second indicator 42 can flash a second predetermined colored light, such as green from a green light emitting diode, to indicate that the weight of the goods being added has not exceeded the predetermined load weight level limit. As the added weight approaches the predetermined load weight level limit, the third indicator 43 having a third predetermined colored light, such as yellow from a yellow light emitting diode, can flash to indicate that the weight being added is below the predetermined limit but is yet only a small percentage less than the limit, e.g., 2–15% less.

Additionally, the load weight indicating apparatus 30 can further include the load weight indicating means 40 having data communications protocol converting means, e.g., provided by a data communications protocol converter 48, for converting a first data communication protocol associated with the vehicle 20 to a second data communications protocol associated with the load weight indicating means 40. The data communication protocol converter 48 also has an RS-485 transceiver connected thereto and to the load weight indication controlling means 55 for transmitting and receiving data communications. As understood by those skilled in the art, the first data communications protocol is preferably a Society of Automotive Engineers ("SAE") J1708 data communications protocol, as understood by those skilled in the art, and the second data communications protocol is preferably an RS-485 data communications protocol. Other protocols such as RS-232, infrared, e.g., IrDA, or radio frequency ("RF") data communications protocols can also be used according to the present invention. This aspect of the invention, for example, advantageously allows the load weight indicating means 40 to communicate with a data communications controller 24 or other portion of a data communication system associated with a vehicle such as along the power line as a carrier or a data bus for the data communications Additionally, this data communication, for example, advantageously allows a calibration or threshold value or signal to be programmed into the memory so that the magnetic sensor is not required or allows other portions of the comparator to be reprogrammed by the data communications on the power line or other data bus associated with the vehicle.

As illustrated in FIGS. 2–3, the data communication along the power line carrier preferably also includes data communication form a controller 24 or other devices associated with or in communication with the power line 26 of the vehicle. For example, the apparatus 30 preferably also includes a height compensator 14 which accumulates data at different air pressures for the same weight load. This height compensator 14 advantageously allows compensation for variances associated with suspension types, tractor or trailer types, owner or manufacturing types in overcoming friction or other factors associated with variances in the air pressure not due to pure lift or load weight.

Also, by way of another example, the apparatus 30 can also include a data table 12 or other look-up table for communicating data to the load weight indicating means 40 such as over the power line 26. As described above, the data table 12 advantageously can include suspension models, truck-types, owner identification, and weight and/or pressures for known suspension models or truck types. This allows the threshold signal in memory 44, for example, to be pre-programmed or allows other calibration or compensation schemes to be readily used.

The load weight indicating means 40 can include an external device drive circuit 57 connected to the load weight indication controlling means 55 for driving at least one of the following: a light or other indicator 29 mounted to the vehicle 20, an audible alarm or buzzer associated with the vehicle 20, or a relay mounted to the vehicle 20. Also, an analog gauge 28 can be positioned to be readily viewable from the interior of the vehicle 20 and connected to the load weight indication controlling means 55 for visually indicating at least the first and second load levels, and preferably all three levels, to a user of the vehicle 20 (see, e.g., FIG. 1). Further, the apparatus 30 can also be mounted so that the plurality of indicators 45 advantageously are readily visible from a mirror 23 of a vehicle 20.

The apparatus 30 can also include an environmental sensor, such as the temperature sensor 54 and/or barometric pressure sensor 56, connected to the load weight indicating means 40 for sensing a plurality of environmental conditions of the load weight indicating means 40. The memory 44 also stores at least one predetermined threshold, e.g., temperature, barometric pressure, humidity, shock, vibration, and the comparing means 50 also compares a sensed condition with the at least one predetermined condition threshold so as to responsively adjust either the calibration signal or the fluid pressure signals when the sensed condition exceeds the at least one predetermined threshold. For example, the temperature or barometric pressure is preferably only periodically sensed because data related to the temperature or barometric pressure does not usually change that rapidly but there is a relationship, as understood by those skilled in the art, between weight load or pressure and temperature as well as other environmental conditions.

The load weight indicating apparatus 30 preferably also has diagnostic capabilities performed by a diagnosing means formed as a stored program or series of command signals in the microcontroller 55 for diagnosing performance or problems associated with the operation of the apparatus 30. For example, the plurality of indicators 45 can blink various signals to a vehicle operator or other trouble shooter so as to indicate a system or other failure, e.g., lack of voltage or power. Also, the apparatus 30 further preferably includes calibration feedback means also formed as a stored program or a series of command signals for providing calibration feedback to a vehicle operator or others desiring the information.

The present invention also advantageously includes methods of indicating load weight of a load mounted on a vehicle 20. A method according to the present invention preferably includes producing a plurality of fluid pressure signals representative of a corresponding plurality of load weights and comparing a predetermined calibration threshold signal to the plurality of fluid pressure signals. When one of the plurality of fluid pressure signals exceeds the predetermined calibration threshold signal, a signal is generated or initiated indicating this condition.

The method can also advantageously include signaling when at least one of the plurality of fluid pressure signals is below the predetermined calibration threshold and signaling when at least one of the plurality of fluid pressure signals is approaching but less than the predetermined calibration threshold. The produced or generated fluid pressure signals are preferably varying analog signals responsive to respective varying fluid pressures in the pressure line 27 of the vehicle 20. The varying analog signals are preferably converted to digital signals.

The method can additionally advantageously include sensing a magnetic field and responsively storing fluid pressure signals in memory. The sensed presence of the magnetic field includes a predetermined magnetic field sensing pattern. Also, the signaling can include converting a first data communication protocol associated with the vehicle 20 to a second data communications protocol. The first data communications protocol, for example, can be provided by an SAE J1708 data communications protocol, and the second data communications protocol, for example, can be provided by an RS-485 data communications protocol.

The method can further include driving at least one of the following: a light or other indicator 29 mounted to the vehicle 20, an audible alarm mounted to the vehicle 20, or a relay or other switch mounted to the vehicle 20. The driving, for example, can be from a transistor or transistor circuit or directly from the microcontroller 55. At least the first and second load levels, and preferably all three load levels, can also be visually indicated to a user of the vehicle 20 positioned in a seat behind the wheel of the vehicle 20.

In addition, the method can advantageously include sensing temperatures of the environment of the vehicle 20, storing at least one predetermined temperature threshold, and comparing a sensed temperature with the at least one predetermined temperature threshold so as to responsively adjust either the calibration signal or the fluid pressure signals when the sensed temperature exceeds the at least one predetermined threshold.

Another method of indicating load weight according to the present invention preferably includes sensing a signal indicating the initiation of a calibration condition and storing a first fluid pressure signal representative of a predetermined load weight level limit in memory responsive to the sensed calibration condition so as to define a predetermined calibration threshold signal. A second fluid pressure signal is then compared to the predetermined calibration threshold signal so as to determine whether the second fluid pressure signal exceeds the predetermined calibration threshold signal.

The method can advantageously include generating a first signal if the second fluid pressure signal exceeds the predetermined calibration threshold, generating a second signal if the second fluid pressure signal is below the predetermined calibration threshold, and generating a third signal if the fluid pressure signal is approaching but less than the predetermined calibration threshold. Additionally, varying analog signals can be produced responsive to respective varying fluid pressures in the pressure line 27 and converting the varying analog signals to digital signals prior to storing or signaling.

Advantageously, the step of sensing preferably includes sensing a magnetic field. The sensed presence of the magnetic field can include a predetermined magnetic field sensing pattern such as several on and off flashes of a magnet adjacent a magnetic sensing switch 58. A first data communication protocol associated with the vehicle 20 can also be converted to a second data communications protocol such as for communicating load weight level conditions. The first data communications protocol, for example, can be provided by an SAE J1708 data communications protocol, and the second data communications protocol, for example, can be provided by an RS-485 data communications protocol. Other data communications protocols, such as IrDA, RS-232, or radio frequency data communication protocols, can also be used as well according to the present invention.

The method additionally can include driving at least one of the following: a light or other indicator 29 mounted to the vehicle 20, an audible alarm mounted to the vehicle 20, or a relay or switch mounted to the vehicle 20. Also, the first and second fluid pressure signals can be visually indicated to a user of the vehicle 20 positioned in a seat behind the wheel of the vehicle or in the cab 22 of a tractor 21 (see, e.g., FIG. 1).

Further, the method can advantageously include sensing environmental temperatures of the vehicle 20, storing at least one predetermined temperature threshold, and comparing a sensed temperature with the at least one predetermined temperature threshold so as to responsively adjust either the calibration signal or the first and second fluid pressure signals when the sensed temperature exceeds the at least one predetermined threshold.

Therefore, the present invention advantageously provides a much simpler and less expensive apparatus 30 and method for indicating load weight to a vehicle operator, vehicle driver, or other person desiring data about the load weight of a vehicle 20. The apparatus 30 and method advantageously provide a simple and light weight device that can be readily mounted to a tractor 21 or trailer 25, readily powered by existing power systems of a vehicle 20, and readily provides at least two and preferably three levels of load weight indication. In other words, a vehicle operator does not always need to know the exact weight of goods that is being loaded into a vehicle at any given time period. Instead, the vehicle operator often only needs to know whether or when the weight limit has been exceeded or whether or when the weight limit is almost being exceeded. The apparatus 30 and method invention also advantageously provides a simple and flexible calibration method for calibrating an initial weight limit value or level for the vehicle. The calibration method, for example, allows the apparatus 30 to avoid inadvertent, unintentional, or undesired calibration attempts.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. An apparatus for warningly indicating load weight of a vehicle actually exceeds a predetermined maximum desired load weight limit level, the apparatus comprising:

a fluid pressure sensor associated with a fluid pressure line of a vehicle for producing a plurality of fluid pressure signals representative of a corresponding plurality of amounts of load weights; and load weight indicating means responsive to said sensor for indicating a plurality of amounts of sensed load weight levels, said load weight indicating means including a memory for storing a calibration signal representative of a predetermined maximum desired load weight limit level, comparing means in communication with said memory and said sensor for comparing the calibration signal to the plurality of fluid pressure signals, and a plurality of indicators each being responsive to said comparing means for indicating at least two actual load weight levels, the plurality of indicators including a first load weight level indicator for only warningly indicating when the load weight level actually exceeds the predetermined maximum desired load weight limit level and a second load weight level indicator for only indicating when the load weight level is actually below the predetermined maximum, desired load weight limit level.

2. An apparatus as defined in claim 1, wherein the plurality of indicators further includes a third load weight level indicator for only indicating when the load weight level is actually above a predetermined percentage of the predetermined maximum desired load weight level limit, the predetermined percentage being less than the predetermined load weight level limit so as to warningly indicate that the load weight level is actually approaching but has not yet actually exceeded the predetermined load weight level limit.

3. An apparatus as defined in claim 2, wherein the first load weight level indicator comprises a red light, wherein the second load weight level indicator comprises a green light, and wherein the third load weight level indicator comprises a yellow light.

4. An apparatus as defined in claim 1, wherein said fluid pressure sensor comprises a transducer positioned in fluid communication with a fluid pressure line of a vehicle.

5. An apparatus as defined in claim 4, wherein said transducer produces varying analog signals responsive to respective varying fluid pressures in the pressure line, and wherein said comparing means of said load weight indicating means further includes an analog-to-digital converter connected to said transducer for converting the varying analog signals to digital signals.

6. An apparatus as defined in claim 4, wherein said comparing means of said load weight indicating means includes load weight indication controlling means connected to said analog-to-digital converter, said memory, and said plurality of indicators for controlling the load weight indication.

7. An apparatus as defined in claim 4, wherein the fluid pressure sensor comprises a first sensor, and wherein said comparing means of said load weight indicating means further includes a second sensor for sensing a predetermined signal to indicate that said load weight indicating means is ready for calibrating to the predetermined maximum desired load weight level.

8. An apparatus as defined in claim 7, wherein said second sensor comprises a magnetically sensitive switch for sensing the presence of a magnetic field, said indication controlling means being responsive to said magnetically sensitive switch so that the sensed presence of the magnetic field responsively stores the fluid pressure signal in the memory.

9. An apparatus as defined in claim 8, wherein the sensed presence of the magnetic field includes a predetermined magnetic field sensing pattern.

10. An apparatus as defined in claim 6, wherein said load weight indicating means further includes data communications protocol converting means for converting a first data communication protocol associated with the vehicle to a second data communications protocol associated with said load weight indicating means.

11. An apparatus as defined in claim 10, wherein said load weight indicating means further includes an RS-485 transceiver connected to said data communications protocol converting means for transmitting and receiving data communications, wherein the first data communications protocol comprises an SAE J1708 data communications protocol, and wherein the second data communications protocol comprises an RS-485 data communications protocol.

12. An apparatus as defined in claim 6, wherein said comparing means of said load weight indicating means further comprises a drive circuit connected to said load weight indication controlling means for driving at least one of the following: a light mounted to the vehicle, an audible alarm associated with the vehicle, or a relay mounted to the vehicle.

13. An apparatus as defined in claim 6, further comprising an analog gauge positioned to be readily viewable from the interior of the vehicle and connected to said load weight indication controlling means for visually indicating at least the first and second load levels to a user of the vehicle.

14. An apparatus as defined in claim 6, wherein said comparing means further includes an environmental sensor connected to said load weight indicating means for sensing a plurality of environmental conditions of said load weight indicating means, wherein said memory also stores at least one predetermined environmental condition threshold, and wherein said comparing means also compares a sensed environmental condition with the at least one predetermined environmental condition threshold so as to responsively adjust either the calibration signal or the fluid pressure signals when the sensed environmental condition exceeds the at least one predetermined environmental condition threshold.

15. An apparatus as defined in claim 14, wherein said comparing means of said load weight indicating means further includes a voltage reference circuit connected to said analog-to-digital converter, said voltage reference circuit including said temperature sensor being associated therewith so that the temperature of said load weight indicating means is periodically supplied to said analog-to-digital converter.

16. An apparatus as defined in claim 1, wherein said comparing means includes hysteresis adjusting means for adjusting the hysteresis of said load weight indicating means.

17. An apparatus as defined in claim 1, further comprising weight indication calibrating means associated with said load weight indicating means for providing a weight indication calibration.

18. An apparatus as defined in claim 17, wherein said weight indication calibrating means includes a data table stored in memory, said data table including data representative of either load weight or pressure for at least one of tractor or trailer suspension type, tractor or trailer type, and owner or manufacturer identification.

19. An apparatus as defined in claim 1, further comprising height compensating means associated with said load weight indicating means for providing a height compensation for variations in at least one of height, pressure, or weight load for differences associated with tractor or trailer suspension type, tractor or trailer type, or owner or manufacturer identification.

20. An apparatus for warningly indicating load weight of a vehicle exceeds a predetermined maximum desired load weight limit level, the apparatus comprising:
a transducer positioned in fluid communication with a fluid pressure line of a vehicle for producing a plurality of fluid pressure signals representative of a corresponding plurality of amounts of load weights;
load weight indicating means responsive to said sensor for indicating a plurality of amounts of sensed load weight levels, said load weight indicating means including a memory for storing a calibration signal representative of a predetermined maximum desired load weight limit level, comparing means in communication with said memory and said sensor for comparing the calibration signal to the plurality of fluid pressure signals, said comparing means including load weight indication controlling means for controlling load weight indications, a sensing switch connected to said load weight indication controlling means for switchingly storing the calibration signal, and a plurality of indicators each being responsive to said comparing means for indicating at least two actual load weight levels, the plurality of indicators including a first load weight level indicator for only warningly indicating when the load weight level actually exceeds the predetermined maximum desired load weight limit level and a second load weight level indicator for only indicating when the load weight level is actually below the predetermined maximum desired load weight limit level; and
sensing switch activating means for activating said sensing switch responsive to a predetermined sensing pattern for storing the calibration signal in said memory.

21. An apparatus as defined in claim 20, wherein the plurality of indicators further includes a third load weight level indicator for only indicating when the load weight level is actually above a predetermined percentage of the predetermined maximum desired load weight level limit, the predetermined percentage being less than the predetermined maximum desired load weight level limit so as to warningly indicate that the load weight level is actually approaching but has not yet exceeded the predetermined maximum desired load weight level limit.

22. An apparatus as defined in claim 21, wherein the first load weight level indicator comprises a red light, wherein the second load weight level indicator comprises a green light, and wherein the third load weight level indicator comprises a yellow light.

23. An apparatus as defined in claim 22, wherein said transducer produces varying analog signals responsive to respective varying fluid pressures in the pressure line, and wherein said comparing means of said load weight indicating means further includes an analog-to-digital converter connected to said transducer and said load weight indication controlling means for converting the varying analog signals to digital signals.

24. An apparatus as defined in claim 23, wherein said sensing switch comprises a magnetically sensitive switch for sensing the presence of a magnetic field, said load weight indication controlling means being responsive to said magnetically sensitive switch so that the sensed presence of the magnetic field responsively stores the fluid pressure signal in the memory, and wherein said sensing switch activating means comprises a magnetized device adaptable to be positioned adjacent said sensing switch.

25. An apparatus as defined in claim 24, wherein the sensed presence of the magnetic field includes a predetermined magnetic field sensing pattern.

26. An apparatus as defined in claim 20, wherein said load weight indicating means further includes data communications protocol converting means for converting a first data communication protocol associated with the vehicle to a second data communications protocol associated with said load weight indicating means.

27. An apparatus as defined in claim 26, wherein said data communication protocol converter includes an RS-485 transceiver connected to said load weight indication controlling means for transmitting and receiving data communications, wherein the first data communications protocol comprises an SAE J1708 data communications protocol, and wherein the second data communications protocol comprises an RS-485 data communications protocol.

28. An apparatus as defined in claim 20, wherein said comparing means of said load weight indicating means further comprises a drive circuit connected to said data communications protocol converting means for driving at least one of the following: a light mounted to the vehicle, an audible alarm mounted to the vehicle, or a relay mounted to the vehicle.

29. An apparatus as defined in claim 20, further comprising an analog gauge positioned to be readily viewable from the interior of the vehicle and connected to said load weight indication controlling means for visually indicating at least the first and second load levels to a user of the vehicle.

30. An apparatus as defined in claim 20, wherein said comparing means of said load weight indicating means further includes an environmental sensor connected to said load weight indicating means for sensing environmental conditions of said data communications protocol converting means, wherein said memory also stores at least one predetermined environmental condition threshold, and wherein said comparing means also compares a sensed environmental condition with the at least one predetermined environmental condition threshold so as to responsively adjust either the calibration signal or the fluid pressure signals when the sensed environmental condition exceeds the at least one predetermined threshold.

31. An apparatus as defined in claim 20, wherein said comparing means of said load weight indicating means further includes a voltage reference circuit connected to said analog-to-digital converter, said voltage reference circuit including said temperature sensor being associated therewith so that the temperature of said load weight indicating means is periodically supplied to said analog-to-digital converter.

32. An apparatus as defined in claim 20, wherein said comparing means includes hysteresis adjusting means for adjusting the hysteresis of said load weight indicating means.

33. An apparatus as defined in claim 20, further comprising weight indication calibrating means associated with said load weight indicating means for providing a weight indication calibration.

34. An apparatus as defined in claim 33, wherein said weight indication calibrating means includes a data table stored in memory, said data table including data representative of either load weight or pressure for at least one of tractor or trailer suspension type, tractor or trailer type, and owner or manufacturer identification.

35. An apparatus as defined in claim 20, further comprising height compensating means associated with said load weight indicating means for providing a height compensation for variations in at least one of height, pressure, or weight load for differences associated with tractor or trailer suspension type, tractor or trailer type, or owner or manufacturer identification.

36. An apparatus for warningly indicating the load weight of a vehicle actually exceeds a predetermined maximum desired load weight, the apparatus comprising:

a transducer associated with the vehicle for sensing fluid pressure in a fluid pressure line, the fluid pressure being representative of an amount of load weight;

an analog-to-digital converter connected to said transducer for converting analog signals from said transducer to digital signals;

a load weight indication controller connected to said analog-to-digital converter for controlling load weight indication;

a magnetically sensitive switch connected to said controller for sensing and switching responsive to a magnetized device being positioned in a proximity of said magnetically sensitive switch; and three light indicators connected to said load weight indication controller for emitting visible light therefrom, each of said three light indicators having a different color light being emitted therefrom for indicating at least three different actual load weight levels being sensed by said transducer, the three light indicators including at least a first load weight level indicator for only warningly indicating when the load weight level actually exceeds a predetermined maximum desired load weight limit level and at least a second load weight level indicator for only indicating when the load weight level is actually below the predetermined maximum desired load weight limit level.

37. An apparatus as defined in claim 36, wherein the three light indicators further include a third light indicator for only indicating when the load weight level is actually above a predetermined percentage of the predetermined maximum desired load weight level limit, the predetermined percentage being less than the predetermined maximum desired load weight level limit so as to warningly indicate that the load weight level is actually approaching but has not yet exceeded the predetermined maximum desired load weight level limit.

38. An apparatus as defined in claim 37, wherein the first, second, and third light indicators respectively comprise a first light emitting diode which emits a red light, a second light emitting diode which emits a green light, and a third light emitting diode which emits yellow light.

39. An apparatus as defined in claim 36, wherein said transducer produces varying analog signals responsive to respective varying fluid pressures in the pressure line, and wherein the apparatus further includes an analog-to-digital converter connected to said transducer and said load weight indication controlling means for converting the varying analog signals to digital signals.

40. An apparatus as defined in claim 36, wherein said load weight indication controller is responsive to said magnetically sensitive switch so that the sensed presence of the magnetic field responsively stores the fluid pressure signal in memory.

41. An apparatus as defined in claim 40, wherein the sensed presence of the magnetic field includes a predetermined magnetic field sensing pattern.

42. An apparatus as defined in claim 36, further including data communications protocol converting means for converting a first data communication protocol associated with the vehicle to a second data communications protocol associated with said load weight indication controller.

43. An apparatus as defined in claim 42, wherein said data communication protocol converter includes an RS-485 transceiver connected to said load weight indication controller therefor for transmitting and receiving data communications, wherein the first data communications protocol comprises an SAE J1708 data communications protocol, and wherein the second data communications protocol comprises an RS-485 data communications protocol.

44. An apparatus as defined in claim 42, wherein the apparatus further includes a drive circuit connected to said data communications protocol converting means for driving at least one of the following: a light mounted to the vehicle, an audible alarm mounted to the vehicle, or a relay mounted to the vehicle.

45. An apparatus as defined in claim 36, further comprising an analog gauge positioned to be readily viewable from the interior of the vehicle and connected to said load weight indication controller for visually indicating at least first and second amounts of load weight levels to a user of the vehicle.

46. An apparatus as defined in claim 36, further comprising a temperature sensor connected to said load weight indicating controller for sensing temperatures of said load weight indicating means, wherein said memory also stores at least one predetermined temperature threshold, and wherein said comparing means also compares a sensed temperature with the at least one predetermined temperature threshold so as to responsively adjust either the calibration signal or the fluid pressure signals when the sensed temperature exceeds the at least one predetermined environmental threshold.

47. An apparatus as defined in claim 36, further comprising a voltage reference circuit connected to said analog-to-digital converter, said voltage reference circuit including said temperature sensor being associated therewith so that the temperature of said load weight indication controller is periodically supplied to said analog-to-digital converter.

48. A method for warningly indicating a load weight for a vehicle actually exceeds a predetermined maximum desired load weight limit level, the method comprising the steps of:

producing a plurality of fluid pressure signals representative of a corresponding plurality of actual amounts of load weights;

comparing a predetermined calibration threshold to the plurality of fluid pressure signals, the predetermined calibration threshold being representative of a predetermined maximum desired load weight limit level; and signaling when one of the plurality of fluid pressure signals exceeds the predetermined calibration threshold by a plurality of indicators including a first load weight level indicator which warningly indicates when at least one of the plurality of fluid pressure signals actually exceeds the predetermined calibration signal and a second separate load weight level indicator which indicates when at least one of the plurality of fluid pressure signal is actually below the predetermined calibration signal.

49. A method as defined in claim 48, further comprising signaling when at least one of the plurality of fluid pressure signals is actually below the predetermined calibration threshold.

50. A method as defined in claim 49, further comprising signaling when at least one of the plurality of fluid pressure signals is approaching but less than the predetermined calibration threshold.

51. A method as defined in claim 50, further comprising producing varying analog signals responsive to respective varying fluid pressures in the pressure line and converting the varying analog signals to digital signals.

52. A method as defined in claim 51, further comprising sensing a magnetic field and responsively storing fluid pressure signals in memory.

53. A method as defined in claim 52, wherein the sensed presence of the magnetic field includes a predetermined magnetic field sensing pattern.

54. A method as defined in claim 53, further comprising converting a first data communication protocol associated with the vehicle to a second data communications protocol.

55. A method as defined in claim 54, wherein the first data communications protocol comprises an SAE J1708 data communications protocol, and wherein the second data communications protocol comprises an RS-485 data communications protocol.

56. A method as defined in claim 55, driving at least one of the following: a light mounted to the vehicle, an audible alarm mounted to the vehicle, or a relay mounted to the vehicle.

57. A method as defined in claim 48, further comprising visually indicating at least the first and second load levels to a user of the vehicle positioned in a seat behind the wheel of the vehicle.

58. A method as defined in claim 56, further comprising sensing temperatures of the vehicle, storing at least one predetermined temperature threshold, and comparing a sensed temperature with the at least one predetermined temperature threshold so as to responsively adjust either the calibration signal or the fluid pressure signals when the sensed temperature exceeds the at least one predetermined threshold.

59. A method of warningly indicating load weight actually exceeds a predetermined maximum load weight limit level, the method comprising the steps of:

sensing a signal indicating the initiation of a calibration condition;

storing a first fluid pressure signal representative of a predetermined maximum desired load weight level limit in memory responsive to the sensed calibration condition so as to define a predetermined calibration threshold signal;

comparing a second fluid pressure signal representative of an actual amount of sensed load weight to the predetermined calibration threshold signal so as to determine whether the second fluid pressure signal actually exceeds the predetermined calibration threshold signal; and visually indicating that the second fluid pressure signal actually exceeds the first fluid pressure signal by a plurality of indicators including a first load weight level indicator which only warningly indicates when the second fluid pressure signal actually exceeds the predetermined calibration signal and a second separate load weight level indicator which only indicates when the sensed fluid pressure signal is actually below the predetermined calibration signal.

60. A method as defined in claim 59, further comprising generating a first signal if the second fluid pressure signal actually exceeds the predetermined calibration threshold.

61. A method as defined in claim 60, further comprising generating a second signal if the second fluid pressure signal is below the predetermined calibration threshold.

62. A method as defined in claim 61, further comprising generating a third signal if the fluid pressure signal is approaching but less than the predetermined calibration threshold.

63. A method as defined in claim 62, further comprising producing varying analog signals responsive to respective varying fluid pressures in the pressure line and converting the varying analog signals to digital signals.

64. A method as defined in claim 59, wherein the step of sensing includes sensing a magnetic field.

65. A method as defined in claim 64, wherein the sensed presence of the magnetic field includes a predetermined magnetic field sensing pattern.

66. A method as defined in claim 59, further comprising converting a first data communication protocol associated with the vehicle to a second data communications protocol.

67. A method as defined in claim 66, wherein the first data communications protocol comprises an SAE J1708 data communications protocol, and wherein the second data communications protocol comprises an RS-485 data communications protocol.

68. A method as defined in claim 59, driving at least one of the following: a light mounted to the vehicle, an audible alarm mounted to the vehicle, or a relay mounted to the vehicle.

69. A method as defined in claim 59, further comprising visually indicating at least the first and second fluid pressure signals to a user of the vehicle positioned in a seat behind the wheel of the vehicle.

70. A method as defined in claim 59, further comprising sensing temperatures of the vehicle, storing at least one predetermined temperature threshold, and comparing a sensed temperature with the at least one predetermined temperature threshold so as to responsively adjust either the calibration signal or the first and second fluid pressure signals when the sensed temperature exceeds the at least one predetermined threshold.

* * * * *

UNITED STATES PATENT AND TRADEMARK OFFICE
CERTIFICATE OF CORRECTION

PATENT NO. : 6,025,563
DATED : February 15, 2000
INVENTOR(S) : Lesesky et al.

It is certified that error appears in the above-identified patent and that said Letters Patent is hereby corrected as shown below:

Column 4, lines 52-54

Strike: "FIG. 1 is a schematic diagram of a heavy duty vehicle including a load weight indicating apparatus according to the present invention;"

Figures 1A, 1B, 1C:
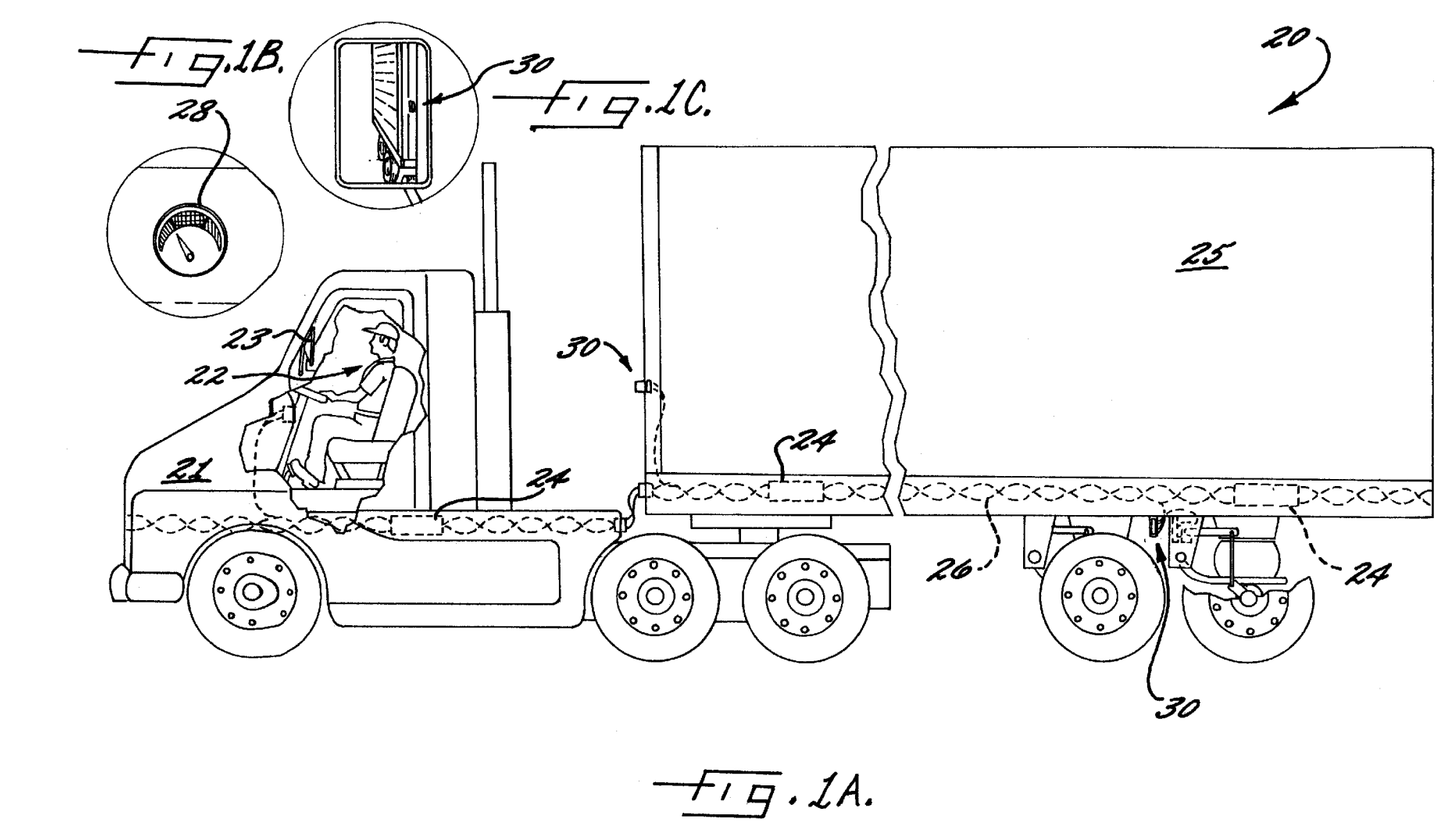
FIG. 1 is schematic diagram of a heavy duty vehicle including a load weight indicating apparatus according to the present invention.

Insert: --FIG. 1A is a schematic diagram of a heavy duty vehicle including a load weight indicating apparatus according to the present invention;

FIG. 1B is an enlarged front elevational view of an analog gauge of a load weight indicating apparatus as viewed by a driver of a heavy duity vehicle according to the present invention;

FIG. 1C is an enlarged front elevational view of a mirror viewing a side of a trailer of a hevy duty vehicle having a load weight indicating apparatus mounted thereto according to the present invention;--

Column 5; Line 17

Strike: "1"
Insert: -- 1A, 1B, 1C --

UNITED STATES PATENT AND TRADEMARK OFFICE
CERTIFICATE OF CORRECTION

PATENT NO. : 6,025,563
DATED : February 15, 2000
INVENTOR(S) : Lesesky et al.

It is certified that error appears in the above-identified patent and that said Letters Patent is hereby corrected as shown below:

Column 10; Line 26     Strike: " FIG. 1"
Insert -- FIGS. 1B-1C --

Column 15; Line 2     Strike: "vehicle exceeds"
Insert: -- vehicle actually exceeds --

Signed and Sealed this

Twenty-first Day of November, 2000

Attest:

Q. TODD DICKINSON

*Attesting Officer*     *Director of Patents and Trademarks*